(12) United States Patent
Goss

(10) Patent No.: US 8,347,761 B2
(45) Date of Patent: Jan. 8, 2013

(54) DRIVE SOCKET DESIGN FOR HOLD AND DRIVE FASTENER

(75) Inventor: David Goss, Rockford, IL (US)

(73) Assignee: Acument Intellectual Properties, LLC, Troy, MI (US)

( * ) Notice: Subject to any disclaimer, the term of this patent is extended or adjusted under 35 U.S.C. 154(b) by 444 days.

(21) Appl. No.: 12/039,176

(22) Filed: Feb. 28, 2008

(65) Prior Publication Data

US 2008/0289455 A1    Nov. 27, 2008

Related U.S. Application Data

(60) Provisional application No. 60/939,248, filed on May 21, 2007.

(51) Int. Cl.
*B25B 13/06* (2006.01)
(52) U.S. Cl. ........ 81/121.1; 81/120; 81/124.2; 81/124.3
(58) Field of Classification Search ............... 81/121.1, 81/120, 124.2, 124.3
See application file for complete search history.

(56) References Cited

U.S. PATENT DOCUMENTS

| 3,908,489 | A | * | 9/1975 | Yamamoto et al. | 81/124.3 |
| 4,006,660 | A | | 2/1977 | Yamamoto et al. | |
| 5,974,916 | A | * | 11/1999 | Lassiter | 81/121.1 |
| 6,158,310 | A | * | 12/2000 | Goss et al. | 81/121.1 |
| 7,225,710 | B2 | * | 6/2007 | Pacheco, Jr. | 81/460 |

FOREIGN PATENT DOCUMENTS

| DE | 9203586.8 | 6/1992 |
| GB | 2153033 A | 8/1995 |

OTHER PUBLICATIONS

European Search Report cited in corresponding European Patent Application No. EP 08 25 1169 dated Oct. 20, 2009.

* cited by examiner

*Primary Examiner* — Lee D Wilson
*Assistant Examiner* — Shantese McDonald
(74) *Attorney, Agent, or Firm* — Clark Hill PLC

(57) ABSTRACT

A drive tool that includes a drive socket. The drive socket includes alternating flutes and lobes and has a conical portion. The lobes, rather than being tapered in the conical portion of the socket, are each uniform in width as they progress to an end of the socket. The fact that the lobes are uniform in width in the conical portion of the drive socket provides for better engagement with the flutes of a conical section of a fastener.

22 Claims, 7 Drawing Sheets

DRIVE SOCKET DESIGN FOR HOLD AND DRIVE FASTENER

RELATED APPLICATION (PRIORITY CLAIM)

This application claims the benefit of U.S. Provisional Application Ser. No. 60/939,248, filed May 21, 2007, which is hereby incorporated herein by reference in its entirety.

BACKGROUND OF THE INVENTION

The present invention generally relates to drive sockets, and more specifically relates to an improved drive socket design for a hold and drive fastener.

U.S. Pat. No. 6,158,310 is hereby incorporated herein by reference in its entirety. FIG. 1 of the present application is FIG. 1 from the '310 patent. As shown in FIG. 1, the '310 patent discloses a drive system 20 in the form of a headed stud or fastener 22 having a drive head 24 and an elongate body 26. Between the drive head 24 and elongate body 26 is a transitional portion 28 which is generally conical. The elongate body 26 has a thread 34 formed thereon, and the transitional portion 28 includes alternating flutes 38 and lobes 40. Each of the flutes 38 and lobes 40 taper outward, progressing from a point 42 at which the drive head 24 meets the transitional portion 28 to the elongate portion 26, and each lobe 40 on the transitional portion 28 includes a thread 44. The drive head 24 also has alternating flutes 46 and lobes 48 which align with the alternating flutes 38 and lobes 40 on the transitional portion 28.

As shown in FIG. 1, also provided is a corresponding drive tool 30 which includes a drive socket 32 which is shaped and configured such that it corresponds with the profile of the drive head 24 and transitional portion 28 of the fastener 22. As such, the drive socket 32 also includes alternating flutes 50 and lobes 52. Specifically, when the drive socket 32 is engaged with the drive head 24 of the fastener 22 (i.e., for driving the fastener 22), portions 54 of the flutes 50 receive the lobes 40 of the transitional portion 28 of the fastener 22, and portions 56 of the flutes 50 receive the lobes 48 of the drive head 24 of the fastener 22. Likewise, portions 58 of the lobes 52 engage the flutes 38 of the transitional portion 28 of the fastener 22, and portions 60 of the lobes 52 engage the flutes 46 of the drive head 24 of the fastener 22. As shown in FIG. 1, portions 54 and 58 of the flutes 50 and lobes 52, respectively, of the drive socket 32, are disposed in a generally conical section 70 of the drive socket 32, and these portions 54, 58 taper (i.e., get wider) as the portions extend from a point 43 at which the conical section 70 begins in the drive socket 32 to the end 72 of the drive tool 30. In contrast, portions 56 and 60 of the flutes 50 and lobes 52, respectively, of the drive socket 32, remain a uniform width as they progress from an inside area 74 of the drive tool 30 to the point 43 at which the conical section 70 begins in the drive socket 32.

The drive socket 32 works to drive the fastener 22, but is configured such that it does not fully engage the flutes 38 of the transitional portion 28 of the fastener 22. For example, the threading forming may cause some threads to carry over into the flute portion of the conical portion of the fastener. As such, the lobes of the socket in the conical or transitional portion may not provide adequate clearance. Therefore, the socket design does not always achieve the target ultimate failure mode of torsional thread section failure.

OBJECTS AND SUMMARY OF THE INVENTION

An object of an embodiment of the present invention is to provide an improved drive socket design for a hold and drive fastener.

Another object of an embodiment of the present invention is to provide a drive socket design which better engages the flutes in a conical section of a fastener.

Briefly, and in accordance with at least one of the foregoing, an embodiment of the present invention provides a drive socket which is in accordance with a preferred embodiment of the present invention. The drive socket is part of a drive tool, and the drive socket is configured such that it engages the flutes in a conical section of a fastener, such as flutes 38 in section 28 of the fastener 22 shown in FIG. 1, better than the drive socket 32 which is disclosed in the '310 patent. Specifically, the drive socket which is in accordance with an embodiment of the present invention includes alternating flutes and lobes. The lobes, rather than being tapered in a conical section of the drive socket as is disclosed in the '310 patent, are each uniform in width as they progress in the conical section to an end of the drive socket. The fact that the lobes are uniform in width in the conical portion of the drive socket provides for better engagement with the flutes of a conical section of a fastener, such as flutes 38 of fastener 22 shown in FIG. 1.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DETAILED DESCRIPTION OF THE ILLUSTRATED EMBODIMENT

Figure 1:
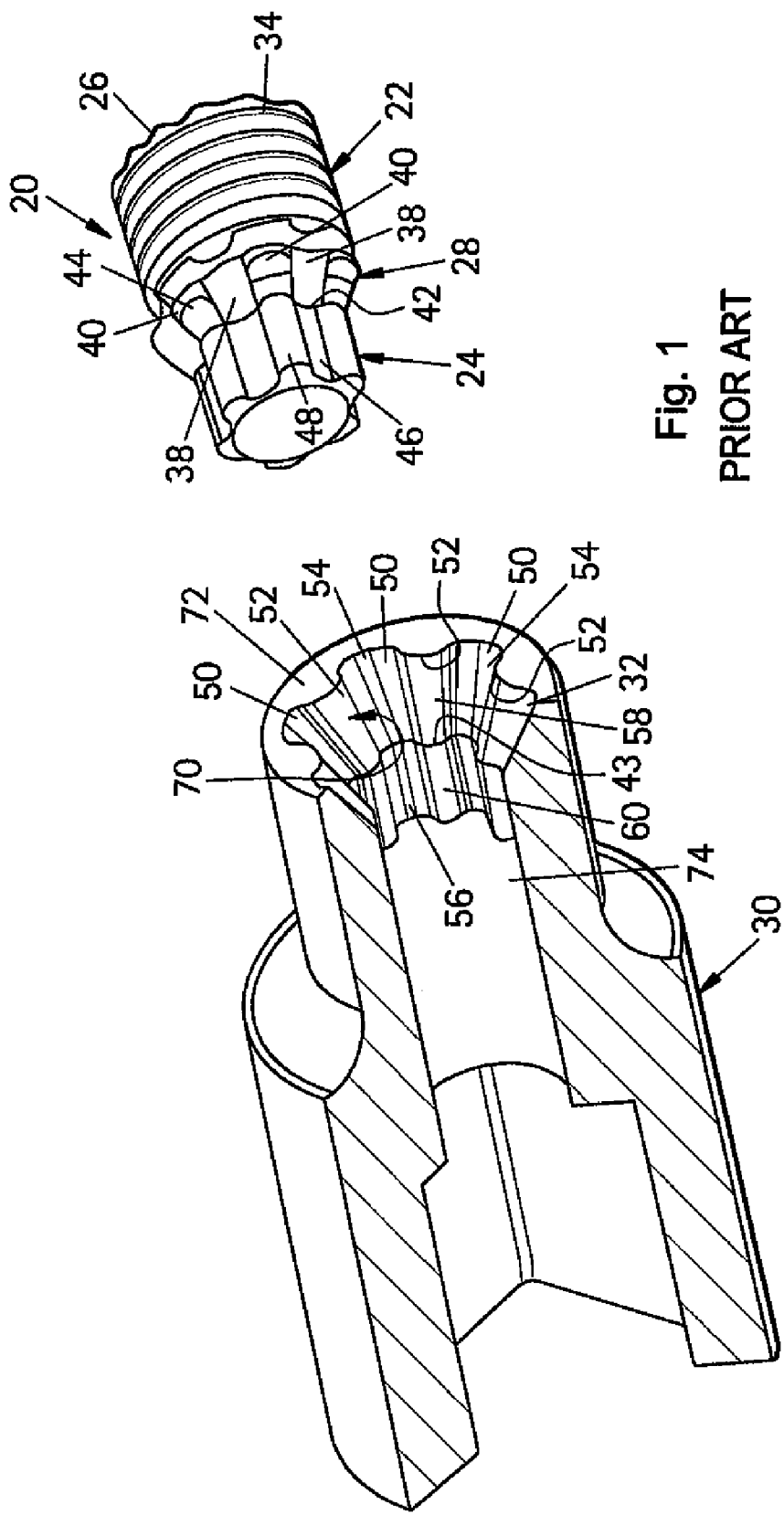
FIG. 1 is an exploded perspective view of a drive end of a fastener and a drive tool, such drive tool being shown partially in cross-section, wherein the fastener and drive tool incorporate features disclosed in U.S. Pat. No. 6,158,310.
Figure 2:
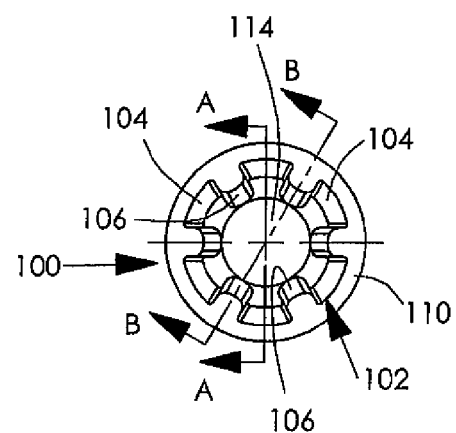
FIG. 2 is an end view of a drive tool which is in accordance with an embodiment of the present invention.

While this invention may be susceptible to embodiment in different forms, there are shown in the drawings and will be described herein in detail, specific embodiments with the understanding that the present disclosure is to be considered an exemplification of the principles of the invention, and is not intended to limit the invention to that as illustrated.

Figure 5:
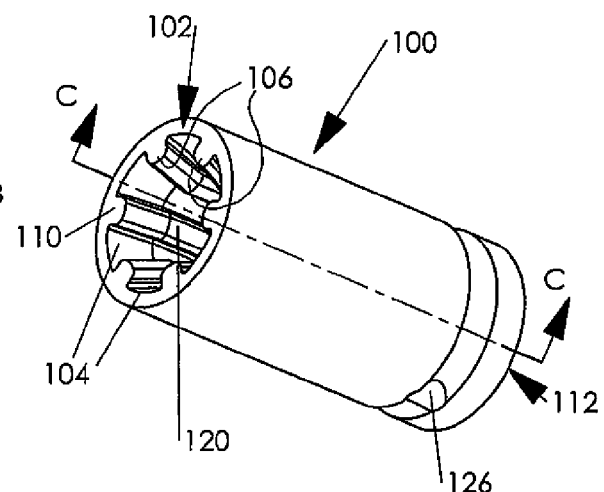
FIG. 5 is a perspective view of the drive tool.

FIG. 5 illustrates a drive tool 100 which includes a drive socket 102 which is in accordance with a preferred embodiment of the present invention. The drive socket 102 is configured such that it engages the flutes in a conical section of a fastener, such as flutes 38 in section 28 of the fastener 22 shown in FIG. 1, better than the drive socket 32 which is disclosed in the '310 patent. Specifically, the drive socket 102 includes alternating flutes 104 and lobes 106. The lobes 106, rather than being tapered in a conical section 108 of the drive socket 102 as is disclosed in the '310 patent, are each uniform in width as they progress in the conical section 108 to an end 110 of the socket 102. The fact that the lobes 106 are uniform in width in the conical section 108 provides more clearance at the flutes 104 in the conical section 108 of the drive socket 102, providing for better engagement with the flutes in a conical section of a fastener, such as flutes 38 in section 28 of the fastener 22 shown in FIG. 1 and disclosed in the '310 patent.

Figure 3:
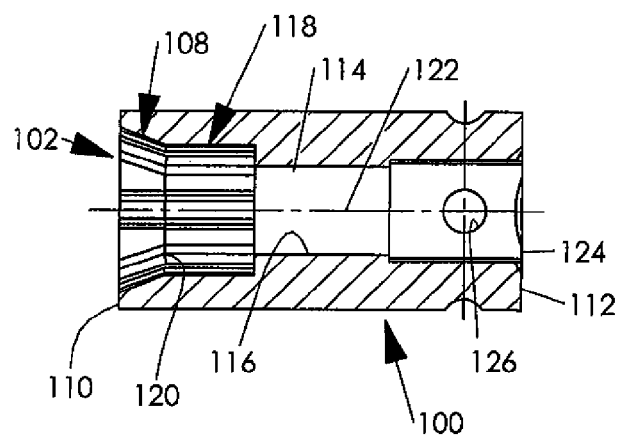
FIG. 3 is a cross-sectional view of the drive tool taken along line A-A of FIG. 2.
Figure 6:
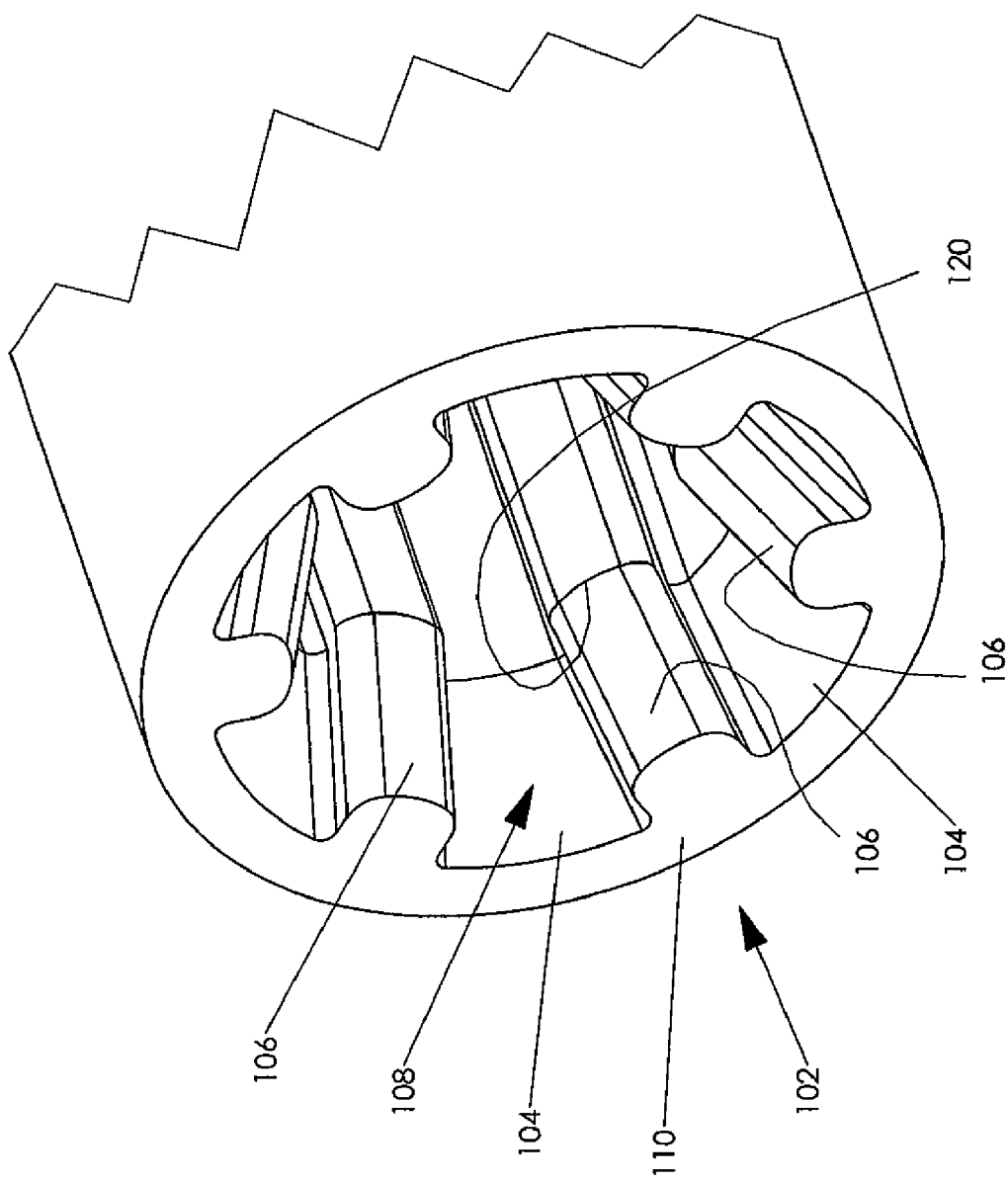
FIG. 6 is an enlarged, perspective view of an end portion of the drive tool.
Figure 7:
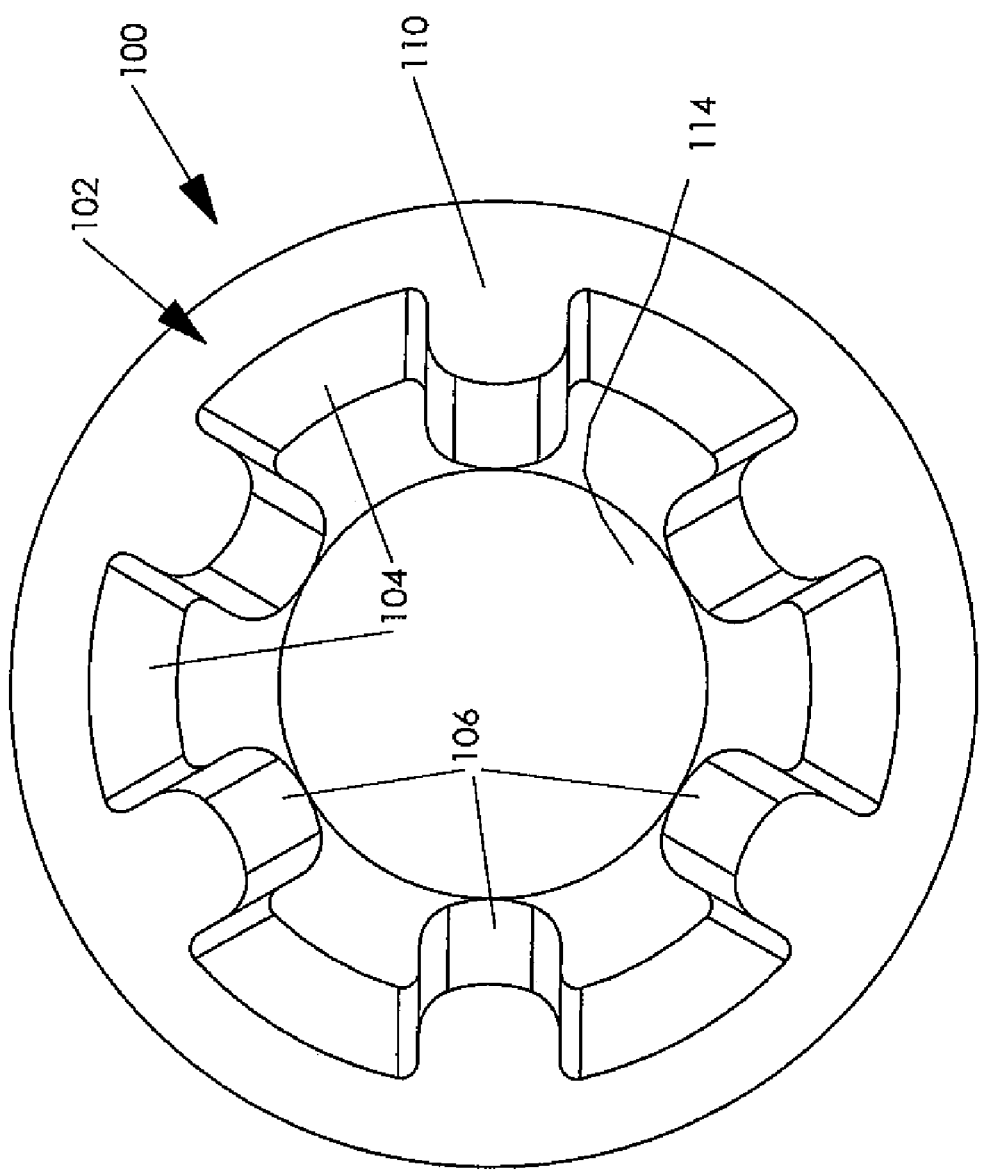
FIG. 7 is an enlarged view of the end of the drive tool.
Figure 8:
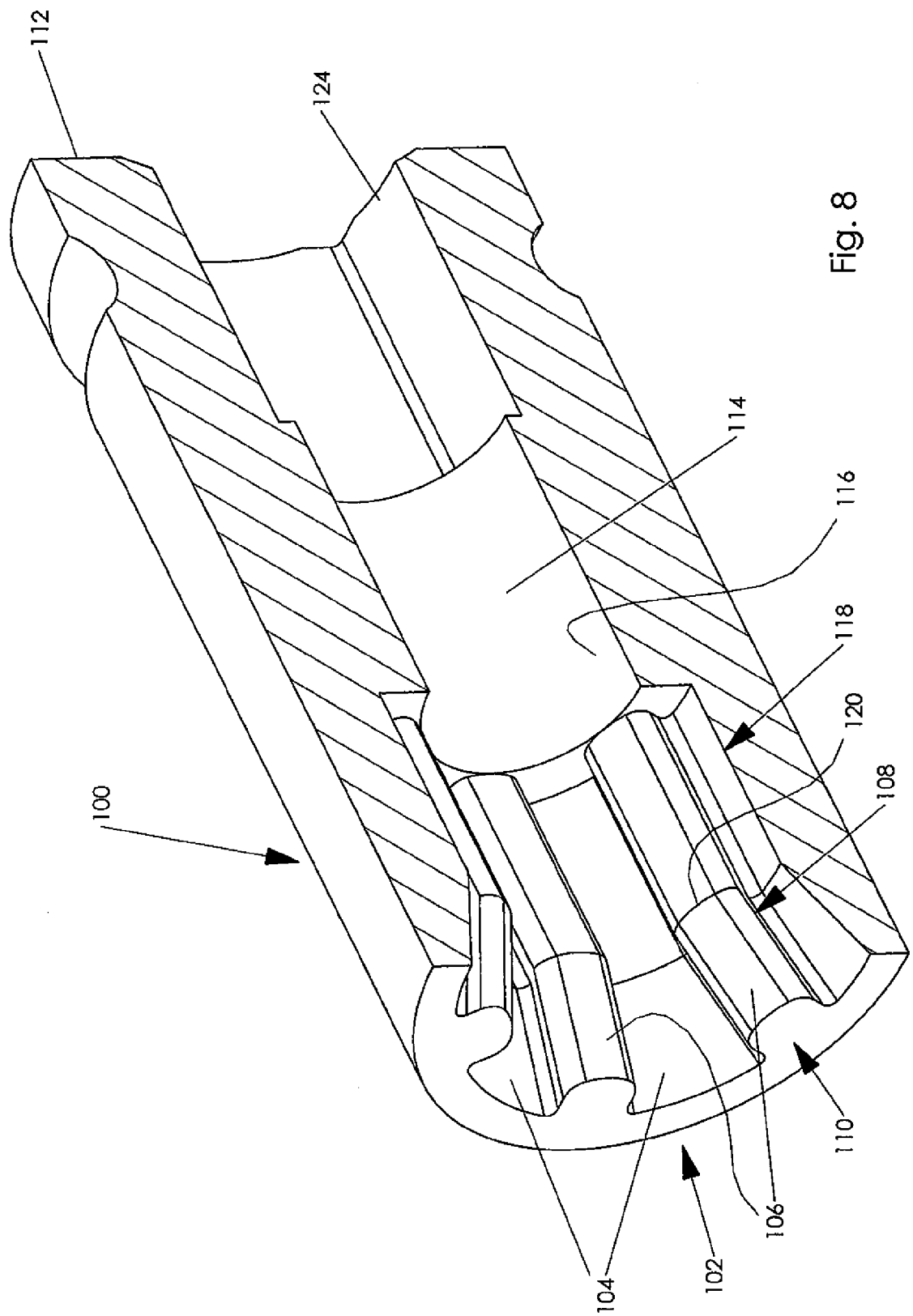
FIG. 8 is a cross-sectional view of the drive tool, taken along line C-C of FIG. 5.
Figure 9:
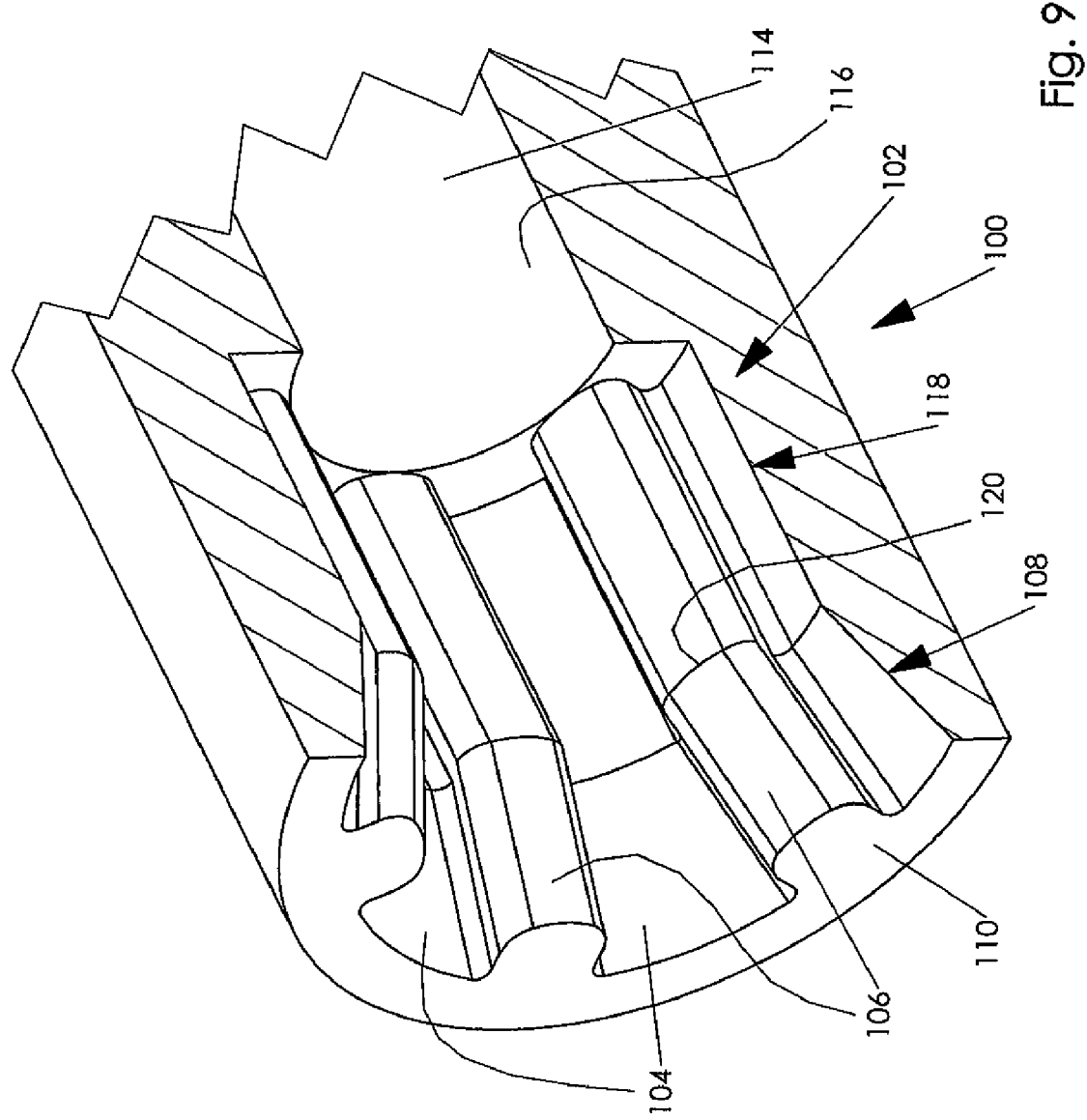
FIG. 9 is similar to FIG. 8, but provides a closer view of the end of the drive tool.
Figure 10:
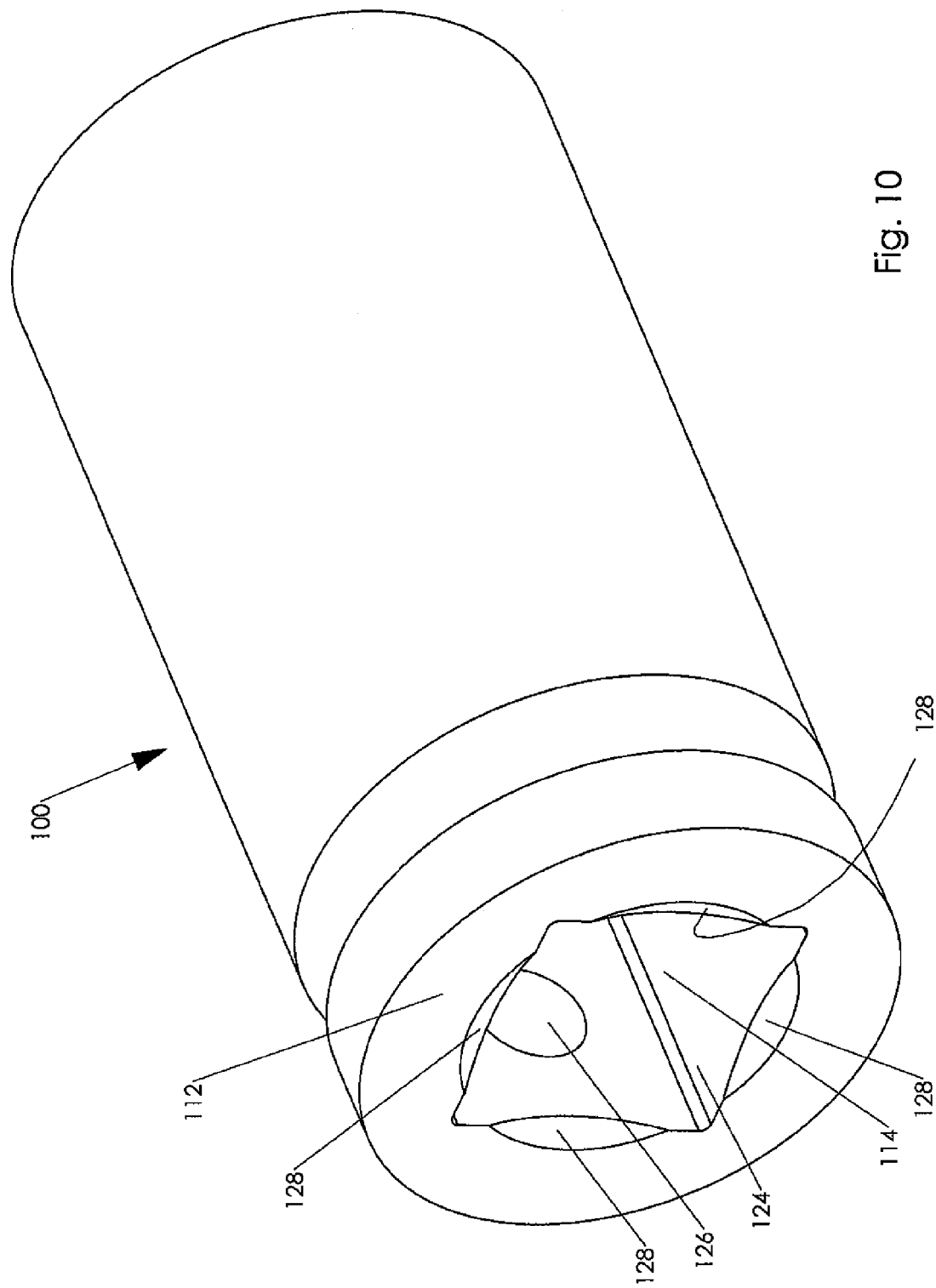
FIG. 10 is another perspective view of the drive tool, showing its rear end which is configured for engagement with a drive member.

As shown in FIG. 5, the drive tool 100 is generally cylindrical having a first, forward end 110 (see FIG. 6) and a second, rear end 112 (see FIG. 10). As shown in FIG. 3, preferably the drive tool 100 includes a central opening 114 which extends from the first end 110 to the second end 112 of the drive tool 100. As shown in FIGS. 2-5, the drive socket 102 is provided proximate the first end 110 of the drive tool 100. As shown in FIGS. 3-5 and 8-9, the conical portion 108 of the drive socket 102 extends from the first end 110 of the drive tool into an interior 116 of the drive tool 100, to a non-conical portion 118 of the drive socket 102. Both the conical and non-conical portions 108, 118 of the drive socket 102 include alternating flutes 104 and lobes 106, configured to engage alternating lobes and flutes, respectively, on a fastener, such as fastener 22 disclosed in the '310 patent and shown in FIG. 1. Each of the lobes 106 are uniform in width along their entire length. More specifically, the lobes 106 do not change width as the lobes 106 extend from the first end 110 of the drive tool 100, along the conical portion 108 and non-conical portion 118. The fact that the lobes 106 are uniform in width in the conical section 108 provides more clearance at the flutes 104 in the conical section 108 of the drive socket 102, providing for better engagement with the flutes of a conical section of a fastener (such as flutes 38 of the fastener 22 shown in FIG. 1).

In contrast, while the flutes 104 are uniform in width in the non-conical section 118, the flutes 104 taper outward (i.e., get wider) (see, for example, FIGS. 6-9) as they extend from the point 120 at which the conical portion 108 and non-conical portion 118 of the drive socket 102 meet, to the end 110 of the drive tool 100.

Figure 4:
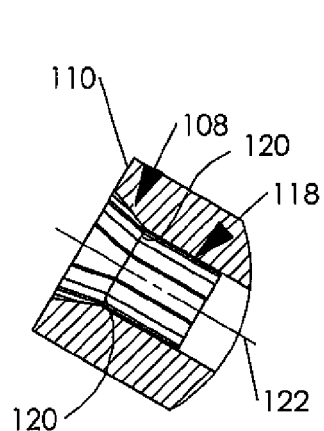
FIG. 4 is a cross-sectional view of the drive tool taken along line B-B of FIG. 2.

As shown in FIG. 3, each of the flutes 104 in the conical section 108 of the drive socket 102 may form a 64 degree angle relative to a flute which is 180 degrees away about the conical portion 108 (in other words, the flutes 104 may form a 32 degree angle with a longitudinal axis 122 of the drive tool 100). Alternatively, each of the flutes 104 in the conical section 108 of the drive socket 102 may instead form some other angle, such as an 80 degree angle relative to a flute which is 180 degrees away about the conical portion 108 (in other words, the flutes 104 may form a 40 degree angle with the longitudinal axis 122 of the drive tool 100). Of course, still other angles and configurations are possible. Regardless, as shown in FIG. 4, preferably each of the lobes 106 in the conical section 108 of the drive socket 102 form about a 50 degree angle relative to a lobe which is 180 degrees away about the conical portion 108 (in other words, the lobes 106 may form about a 25 degree angle with the longitudinal axis 122 of the drive tool 100). Of course, still other angles and configurations are possible.

As shown in FIG. 10, preferably the central opening 114 through the drive tool 100 provides that there is an opening 124 at the rear end 112 of the drive tool 100 for receiving a square drive member (not shown). Of course, the rear end 112 of the drive tool 100 may take other take other configurations and profiles depending on the drive member which is to be engaged with the drive tool 100. As shown, if the rear end 112 of the drive tool 100 is configured to receive a square drive member preferably the drive tool 100 includes an aperture 126 for receiving a ball detent on the drive member, thereby securably retaining the drive member, and has angled walls 128 for facilitating receipt of the drive member into the opening 124.

While it has been discussed that the drive tool 100 can be used to drive a fastener 22 such as is disclosed in the '310 patent, the drive tool 100 can be used to drive fasteners which are shaped and configured differently, such as a fastener which has lobes which do not taper in the conical or transitional portion of the fastener.

While preferred embodiments of the invention are shown and described, it is envisioned that those skilled in the art may devise various modifications without departing from the spirit and scope of the foregoing description.

What is claimed is:

1. A drive system comprising:
a first member having a non-conical section and a conical section, the non-conical section having alternating flutes and lobes, the conical section having alternating flutes and lobes, the lobes of the conical section tapering as they progress toward the non-conical section, the flutes of the conical section tapering as they progress toward the non-conical section; and
a second member having a non-conical section and a conical section, the non-conical section of the second member having alternating flutes and lobes, the conical section of the second member having alternating flutes and lobes, the lobes of the conical section of the second member having a uniform width as the lobes progress from the non-conical section of the second member to an end of the second member, the flutes of the conical section of the second member having a width which tapers as the flutes progress in the conical section of the second member from the end of the second member to the non-conical section of the second member,
wherein the alternating flutes and lobes of the non-conical section of the second member are configured to engage with the alternating lobes and flutes of the non-conical section of the first member, respectively, and wherein the alternating flutes and lobes of the conical section of the second member are configured to engage with the alternating lobes and flutes of the conical section of the first member.

2. The drive system as defined in claim 1, wherein the first member is a fastener and the second member is a socket of a drive tool.

3. The drive system as defined in claim 2, wherein the fastener further has an elongate body, the conical section of the fastener being positioned between the non-conical section of the fastener and the elongate body of the fastener.

4. The drive system as defined in claim 3, wherein the elongate body of the fastener has a thread formed thereon, and wherein the lobes of the conical section of the fastener have threads formed thereon.

5. The drive system as defined in claim 1, wherein the lobes of the non-conical section of the first member and the flutes of the non-conical section of the second member are both uniform in width.

6. The drive system as defined in claim 1, wherein the lobes of the non-conical section of the second member and the flutes of the non-conical section of the first member are both uniform in width.

7. The drive system as defined in claim 1, wherein a first angle is formed between the lobes in the conical section of the second member which are 180 degrees away from one another, and wherein a second angle is formed between the flutes in the conical section of the second member which are 180 degrees away from one another, and wherein the first angle is smaller than the second angle.

8. The drive system as defined in claim 7, wherein the first angle formed between the lobes in the conical section of the second member is 50 degrees.

9. The drive system as defined in claim 8, wherein the lobes in the conical section of the second member form a 25 degree angle with a longitudinal axis of the second member.

10. The drive system as defined in claim 8, wherein the second angle formed between flutes in the conical section of the second member is 64 degrees.

11. The drive system as defined in claim 10, wherein the flutes in the conical section of the second member form a 32 degree angle with a longitudinal axis of the second member.

12. The drive system as defined in claim 8, wherein the second angle formed between flutes in the conical section of the second member is 80 degrees.

13. The drive system as defined in claim 12, wherein the flutes in the conical section of the second member form a 40 degree angle with a longitudinal axis of the second member.

14. The drive system as defined in claim 7, wherein the second angle formed between flutes in the conical section of the second member is 64 degrees.

15. The drive system as defined in claim 14, wherein the flutes in the conical section of the second member form a 32 degree angle with a longitudinal axis of the second member.

16. The drive system as defined in claim 14, wherein the flutes in the conical section of the second member form a 40 degree angle with a longitudinal axis of the second member.

17. The drive system as defined in claim 7, wherein the second angle formed between flutes in the conical section of the second member is 80 degrees.

18. A drive system comprising:
a first member having a conical section the conical section having alternating flutes and lobes;
a second member haying a conical section, the conical section of the second member having alternating flutes and lobes,
wherein the alternating flutes and lobes of the conical section of the second member are configured to engage, respectively, the alternating lobes and flutes of the conical section of the first member, and wherein the alternating flutes and lobes of the conical section of the second member are shaped in a non-complementary manner, respectively, to the alternating lobes and flutes of the conical section of the first member, and wherein the lobes of the conical section of the second member are uniform in width, and wherein the flutes of the conical section of the first member taper in width as they progress toward the non-conical section of the first member.

19. The drive system as defined in claim 18, wherein the first member is a fastener and the second member is a socket of a drive tool.

20. The drive system as defined in claim 19, wherein the fastener further has a non-conical section and an elongate body, the conical section of the fastener being positioned between the non-conical section of the fastener and the elongate body of the fastener.

21. The drive system as defined in claim 20, wherein the elongate body of the fastener has a thread formed thereon, and wherein the lobes of the conical section of the fastener have threads formed thereon.

22. A drive system comprising:
a fastener having a conical section, the conical section having alternating flutes and lobes, the lobes of the conical section tapering in width as they progress from a first end of the conical section to a second end of the conical section, the flutes of the conical section tapering in width as they progress from the first end of the conical section to the second end of the conical section, the lobes of the conical section having at least one thread formed thereon; and
a socket of a drive tool having a conical section, the conical section of the socket having alternating flutes and lobes, the lobes of the conical section of the socket having a uniform width as the lobes progress from a first end of the conical section of the socket to a second end of the conical section of the socket, the flutes of the conical section of the socket having a width which tapers in width as the flutes progress in the conical section of the socket from the first end of the conical section of the socket to the second end of the conical section of the socket,
wherein the alternating flutes and lobes of the conical section of the socket are configured to engage with the alternating lobes and flutes of the conical section of the fastener.

* * * * *